(12) United States Patent
Walton et al.

(10) Patent No.: US 8,607,966 B2
(45) Date of Patent: Dec. 17, 2013

(54) APPARATUS AND METHOD FOR CONVEYING COHESIVE MATERIALS

(76) Inventors: Otis Walton, Livermore, CA (US); Ali Ismail Abdel-Hadi, Auburn, AL (US); Christopher Brian Dreyer, Lakewood, CO (US)

( * ) Notice: Subject to any disclaimer, the term of this patent is extended or adjusted under 35 U.S.C. 154(b) by 249 days.

(21) Appl. No.: 13/044,328

(22) Filed: Mar. 9, 2011

(65) Prior Publication Data

US 2011/0220462 A1    Sep. 15, 2011

Related U.S. Application Data

(60) Provisional application No. 61/312,544, filed on Mar. 10, 2010.

(51) Int. Cl.
*B65G 15/00* (2006.01)
*B65G 17/00* (2006.01)
*B65G 47/00* (2006.01)

(52) U.S. Cl.
USPC ............... 198/550.6; 414/293; 198/617

(58) Field of Classification Search
USPC ............ 414/293, 300, 301; 198/550.6, 658, 198/670, 671
See application file for complete search history.

(56) References Cited

U.S. PATENT DOCUMENTS

| | | | |
|---|---|---|---|
| RE39,339 E * | 10/2006 | Andersen et al. | 106/206.1 |
| 7,314,131 B2 | 1/2008 | Olds | |
| 2008/0051814 A1* | 2/2008 | Beaupre | 606/169 |
| 2008/0099310 A1* | 5/2008 | Olds | 198/671 |

* cited by examiner

*Primary Examiner* — Ramya Burgess
*Assistant Examiner* — Lester Rushin

(57) ABSTRACT

An apparatus and a method include a pipe comprising a first end, a second end and an interior wall. The pipe is configured for rotation about an axis with a rotational rate sufficient for a cohesive material to remain stationary in a layer on the interior wall. A plurality of blades is configured for deflecting the cohesive material. Each of the blades includes a blade edge having a curvature corresponding to a portion of the interior wall. A support structure supports the blade edges with each of the blade edges proximate the interior wall and having an angle with respect to a plane perpendicular to the axis. An inlet apparatus feeds the cohesive material into the first end where a difference in rotational rate between the interior wall and the plurality of blades, and the angle determines a rate of conveyance of the cohesive material along the interior wall.

20 Claims, 8 Drawing Sheets

APPARATUS AND METHOD FOR CONVEYING COHESIVE MATERIALS

CROSS-REFERENCE TO RELATED APPLICATIONS

The present Utility patent application claims priority benefit of the U.S. provisional application for patent Ser. No. 61/312,544 entitled "Centrifuging Pipe Conveyor for Granular Solids", filed on 10 Mar. 2010 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to mechanical conveying of granular solids. More particularly, the invention relates to the use of mechanical rotating motion to achieve axial motion of a granular solid or viscous liquid, analogous to screw conveying.

BACKGROUND OF THE INVENTION

Granular solids are a class of materials which generally have a resistance to deformation that is caused by a combination of interparticle friction, dilatant effects of grain rearrangement and cohesion, if it is present. The frictional nature of granular materials' resistance to deformation usually means that the effective shear strength of the bulk material increases with confining load. Because of this pressure-dependent deformation resistance, it is nearly impossible to push most granular materials down a pipe with a piston. An analysis to predict the stresses in storage silos by Janssen circa 1885 can be adapted, with only minor changes, to predict the stresses in a granular solid pushed in a pipe. Such an analysis shows that the resistance to pushing with a piston increases exponentially with the length of the slug being pushed. Primarily for this reason, methods which are commonly used to move fluids in pipes by creating a high pressure at one end of a pipe, do not work for 'pumping' granular solids through pipes. Generally, only mechanisms that create relatively short sections or slugs of granular material, and deliver a driving force to each slug separately, work to move granular materials through pipes. As a consequence, screw conveyors are one commonly used means of moving non-cohesive granular solids over modest distances. However, the design of screw conveyors has not changed a great deal since Greek mathematician and physicist Archimedes invented the screw conveyor in 235-240 B.C. aside from using improved materials and fabrication techniques and adding electricity as a power source.

For horizontal conveying or for gentle inclines (e.g., less than about 25 degrees), screw conveyors can be either in fully enclosed tubes or open-topped with a helical screw near the bottom of a U-shaped trough. The open-topped style conveyors generally operate at low rotation rates with granular material being pushed along the rising side of the screw faces, not unlike a bulldozer blade pushing material over the surface of the ground, except that the screw face is continuously moving up and the material is sliding down the face as it moves axially along the tube. For steeper inclinations, or vertical applications, fully enclosed tubes are employed and higher rotation rates are often used. The mechanism of motion of the granular material inside fully enclosed screw conveyors, with rapid rotation, is enhanced by the resistance to rotary or vortex motion of the bulk solid being provided by the total casing surface. In a vertical orientation, at high rotation rates, the typical motion of a granular solid follows a generally helical path of 'opposite-hand' from that of the screw driving the material. The granular solid slides continuously on both the outer wall and on the screw faces. The screw blades in conventional screw conveyors are typically in the shape of a helicoid with a pitch such that the slope of the screw surface, as measured from a plane perpendicular to the screw axis, varies from a value between 30 and 45 degrees next to the outer wall to something much steeper next to the central shaft of the screw. The wall friction of the tube, the angle of the screw face, the friction coefficient between the granular solid and the outer wall, and the friction with the screw face all contribute to proper functioning of conventional screw conveyors. The effect of the outer wall friction is enhanced at high rotation rates by the centrifugal force of the solid traveling along its helical path. The increase in outer wall normal force, due to the vortex motion of the solid, increases the friction force on the outer wall, which actually assists in the conveying action of the screw, albeit at the expense of somewhat higher energy loss due to overcoming the higher friction forces.

Screw conveyors are generally used with free flowing granular solids, and they are less reliable when used with cohesive powders, wet materials, or generally with materials that have the cohesive strength of wet sand (i.e., about 10 kPa) or greater. For such cohesive materials, the screw sometimes fills with the cohesive material along part of its length, and then the entire screw and filled material rotate around the axis, with the fill-material sliding on the outer wall as it travels circumferentially around the axis yet not moving axially along the tube. For this reason, screw conveyors are not always reliable in applications that may have highly variable material properties, as may be the case when the moisture content or temperature of the conveyed material varies from time to time, in such a manner as to exhibit significant cohesion under some conditions. The high rotation rates of fully enclosed tube screw conveyors allow them to be used with granular materials with a somewhat broader range of cohesion; however, they are still not a reliable method for material any more cohesive than typical wet sand. Accordingly, it would be desirable and useful to provide effective means for moving granular materials with a wide range of cohesive strength. Flow-assistance measures are sometimes used, with varying degrees of success, to transport cohesive materials in screw conveyors, such as external vibrators for dislodging the material and/or breaking up cohesive clumps. Such flow assistance measures are often difficult to design in such a manner that they provide reliable assistance uniformly along the entire length of the screw conveyor, and thus, are not a robust or versatile solution for conveying cohesive materials.

The original Archimedes screw was designed and used for water, and was used by the Egyptians to pump bilge water out of ancient sailing ships and for pumping irrigation water out of rivers or canals. Large-scale Archimedes water screws are used today in applications requiring rapid movement of large volumes of water, as in storm water runoff systems. Large-scale Archimedes screws can sometimes handle highly viscous fluids; however, as the size is scaled down, the ability of the Archimedes screw to convey highly viscous or cohesive fluids decreases significantly. Thus, for fluids, their use is most commonly restricted to low viscosity liquids, such as water.

During the 1980's researchers at Lawrence Livermore National Laboratory examined the flow behavior of granular solids in the inside of rapidly rotating horizontal and vertical cylinders and cones. The primary focus of those investigations were to study the flow of granular solids on the inner walls of rapidly rotating, horizontal axis conical sections, not unlike a conical megaphone which is rapidly rotating about its axis and has sand poured into the small end. In those studies, the sand formed an inner cone angle equal to its natural angle of repose measured from the axis of the rotating cone to the angle of the inner sand surface, independent of the actual angle of the rotating cone into which it was placed. Theoretical analyses and numerical simulations of granular material centrifuging on the inner walls of rotated horizontal and vertical cylinders were also part of that research. That work showed, that in order for a granular material to remain stationary on the inner wall of a rapidly rotating vertical pipe, the rate of rotation must be sufficient for the following two inequalities to both be satisfied, $$\frac{\omega_p^2 R_i}{g} > \frac{1}{\tan\phi_r}, \text{ and } \frac{\omega_p^2 R_i}{g} > \frac{1}{\tan\phi_w},$$

where $\omega_p$ is the angular rotation rate (rad/s) of the pipe, $R_i$ is the inner radius of the granular layer on the inside of the rotating pipe, g is the acceleration of gravity, $\phi_w$ is the wall friction angle between the pipe wall and the granular solid (i.e., the arctangent of the wall friction coefficient), and $\phi_r$ is the angle of repose of the granular material. For horizontal pipes, similar relations were obtained, except that sin $\phi$ replaced tan $\phi$. Thus, for horizontal pipes the material will remain stationary with respect to the pipe wall, if the following two relations are satisfied, $$\frac{\omega_p^2 R_i}{g} > \frac{1}{\sin\phi_r}, \text{ and } \frac{\omega_p^2 R_i}{g} > \frac{1}{\sin\phi_w}.$$

For typical material and wall properties this means that a horizontal pipe needs to rotate more than 40% faster than enough for the centrifugal force to just balance gravity at the inner surface of the granular material at the top of the cylinder in order to prevent any circumferential sliding or shearing of the rotating granular layer on the wall of the pipe. At slower rotation rates, gravity tends to cause a slight slowing and shearing deformation of the 'rising' material and a slight acceleration of the 'falling' material, at circumferential locations that would correspond to about the 10:30 o'clock and 1:30 o'clock positions, assuming an analog clock face is oriented perpendicular to the pipe's axis.

A rotating-casing screw conveyor was recently developed (U.S. Pat. No. 7,314,131 B2, Jan. 1, 2008) which utilizes a rotating cylindrical pipe and a stationary central helical screw. This "Olds Elevator" rotating-casing screw conveyor uses less energy under certain conditions in vertical conveying than conventional stationary-pipe screw-conveyors and is able to vertically-convey somewhat more-cohesive materials. The Olds Elevator conveyor has certain features, however, which limit its applicability. First, it functions well only in near-vertical orientations and does not convey solids well horizontally, or at shallow angles of inclination. Second, its energy-efficiency increases with the rotation rate of the pipe, as does the conveying mass flow rate, up until a certain maximum operating rotation rate is reached. At rotation rates beyond this optimum speed, the conveying efficiency very rapidly declines. This makes the Olds Elevator relatively efficient only at conveying rates which are at, or very close to, its maximum conveying capacity. At lower conveying rates its energy efficiency decreases significantly. Thus, it has a limited range of conveying rates over which it offers significant efficiency advantages over conventional screw conveyors. The present invention provides a broader range of operating conditions under which efficient conveying can be achieved.

In view of the foregoing, there is a need for improved techniques for mechanically conveying granular solids that can handle a wide range of materials and is efficient over a wide range of conveying rates.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a cross sectional front view, and FIG. 1B is a cross sectional side view;

FIG. 2A is a cross sectional front view, and FIG. 2B is a cross sectional side view;

FIG. 3A is a cross sectional front view, and FIG. 3B is a cross sectional side view;

FIG. 5A is a front view, and FIG is a cross sectional side view;

Figure 1A:
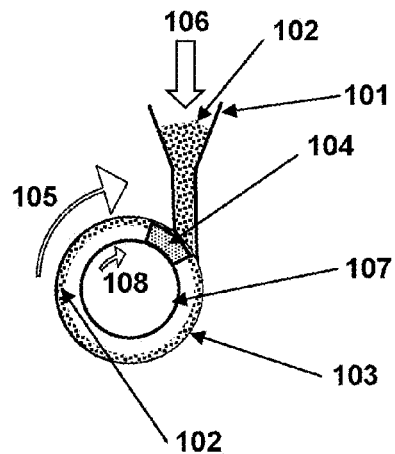
FIGS. 1A and 1B illustrate an exemplary granular material conveyor system in a horizontal conveying orientation, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, an apparatus and method for conveying cohesive materials is presented.

In one embodiment an apparatus includes means for rotating about a longitudinal axis with a rotational rate at least sufficient for a cohesive material, feed into the rotating means, to remain substantially stationary in a layer on an interior of the rotating means, means for deflecting the cohesive material along the interior, means for supporting the deflecting means within the interior along a line at a fixed distance from a longitudinal axis of the rotating means and means for feeding the cohesive material into the rotating means where a difference in rotational rate between the interior and the deflecting means at least in part determines a rate of conveyance of the cohesive material axially along the interior.

In another embodiment an apparatus includes a cylindrical pipe comprising a first open end, a second open end and an interior wall, the cylindrical pipe being configured to be operable for rotation about a longitudinal axis with a rotational rate at least sufficient for a cohesive material, feed into the cylindrical pipe, to remain substantially stationary in a layer on the interior wall during the rotation. A plurality of blades is configured to be operable for deflecting the cohesive material. Each of the blades includes a blade edge having a curvature substantially corresponding to a portion of the interior wall. A support structure supports the blade edges within an interior of the cylindrical pipe along a line at a fixed distance from the longitudinal axis with each of the blade edges proximate the interior wall and having an angle with respect to a plane perpendicular to the longitudinal axis. An inlet feed apparatus feeds the cohesive material into the first open end where a difference in rotational rate between the interior wall and the plurality of blades, and the angle at least in part determines a rate of conveyance of the cohesive material axially along the interior wall. In another embodiment the support structure is configured to be operable to vary the angle from a first angle through a zero angle to a second angle where the rate of conveyance varies in a first direction with the angle at the first angle to the zero angle, the rate of conveyance is zero with the angle at the zero angle, and the rate of conveyance varies in a second direction with the angle from zero to the second angle. In yet another embodiment the support structure is configured to be operable to vary a rotation of the plurality of blades independently from the cylindrical pipe from a first rotational rate less than the rotational rate of the cylindrical pipe through the rotational rate of the cylindrical pipe to a second rotational rate greater than the rotational rate of the cylindrical pipe where the rate of conveyance varies in a first direction with the rotation of the plurality of blades at the first rotational rate to the rotational rate of the cylindrical pipe, the rate of conveyance is zero with the rotation of the plurality of blades at the rotational rate of the cylindrical pipe, and the rate of conveyance varies in a second direction with the rotation of the plurality of blades from rotational rate of the cylindrical pipe to the second rotational rate. In still another embodiment the line of the blade edges further comprises a plurality of curves. In another embodiment each of the blades edges further comprises a portion having a zero angle with respect to the plane perpendicular to the longitudinal axis. In yet another embodiment the blade edges are joined to form a ribbon. In still another embodiment the blade edges are joined to form a continuous ribbon. In another embodiment the line of the blade edges is positioned where gravity lowers a normal force of the cohesive material on the interior wall and where gravity accelerates the cohesive material in a circumferential direction with the apparatus in a horizontal or inclined position. In yet another embodiment each of the blade edges the angle varies along the blade edge. In still another embodiment the cylindrical pipe is further configured to be operable for feeding the cohesive material to an additional cylindrical pipe being configured to be operable substantially as the cylindrical pipe enabling a plurality of apparatuses to be daisy-chained together. In another embodiment the inlet feed apparatus is configured to be operable for feeding the cohesive material at a rate substantially equaling the rotational rate of the cylindrical pipe. In yet another embodiment the cohesive material comprises a granular material.

In another embodiment a method includes the steps of rotating a cylindrical pipe comprising a first open end, a second open end and an interior wall with a rotational rate at least sufficient for a cohesive material, feed into the cylindrical pipe, to remain substantially stationary in a layer on the interior wall during the rotation. The method includes supporting a plurality of blades within an interior of the cylindrical pipe along a line at a fixed distance from the longitudinal axis with each of the blade edges proximate the interior wall and having an angle with respect to a plane perpendicular to the longitudinal axis for deflecting the cohesive material, each of the blades comprising a blade edge having a curvature substantially corresponding to a portion of the interior wall. The method includes feeding the cohesive material into the first open end where a difference in rotational rate between the interior wall and the plurality of blades, and the angle at least in part determines a rate of conveyance of the cohesive material axially along the interior wall. Another embodiment further includes the step of varying the angle from a first angle through a zero angle to a second angle where the rate of conveyance varies in a first direction with the angle at the first angle to the zero angle, the rate of conveyance is zero with the angle at the zero angle, and the rate of conveyance varies in a second direction with the angle from zero to the second angle. Yet another embodiment further includes the step of varying a rotation of the plurality of blades independently from the cylindrical pipe from a first rotational rate less than the rotational rate of the cylindrical pipe through the rotational rate of the cylindrical pipe to a second rotational rate greater than the rotational rate of the cylindrical pipe where the rate of conveyance varies in a first direction with the rotation of the plurality of blades at the first rotational rate to the rotational rate of the cylindrical pipe, the rate of conveyance is zero with the rotation of the plurality of blades at the rotational rate of the cylindrical pipe, and the rate of conveyance varies in a second direction with the rotation of the plurality of blades from rotational rate of the cylindrical pipe to the second rotational rate. Still another embodiment further includes the step of positioning the line of the blade edges to where gravity lowers a normal force of the cohesive material on the interior wall and where gravity accelerates the cohesive material in a circumferential direction with operation in a horizontal or inclined position. Another embodiment further includes the step of feeding the cohesive material from the cylindrical pipe to an additional cylindrical pipe being configured to be operable substantially as the cylindrical pipe enabling a plurality of apparatuses to be daisy-chained together. Yet another embodiment further includes the step of feeding the cohesive material further comprises feeding the cohesive material at a rate substantially equaling the rotational rate of the cylindrical pipe. In still another embodiment the cohesive material comprises a granular material.

Other features, advantages, and objects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A preferred embodiment of the present invention and at least one variation thereof make use of the analyses of granular material behavior on the inner walls of rapidly rotated vertical and horizontal pipes described in the foregoing to develop operating conditions for a method of mechanically conveying granular solids axially along the inside walls of rapidly rotating cylindrical pipes oriented at any inclination angle from straight up to horizontal to straight down. Many preferred embodiments are more robust, can handle a wider range of materials, and, in some embodiments, can have significantly lower frictional losses than conventional screw conveyors. Materials that may be conveyed by a preferred embodiment include without limitation, granular solids, highly cohesive materials, viscous fluids, etc.

The centrifuging pipe conveyor of a preferred embodiment of the present invention uses a mode of solids transport wherein a granular material spends most of its time centrifuged onto the wall of a rotating pipe with no relative motion between the material and the pipe wall. Once per revolution the material on the wall encounters a stationary or slower moving angled blade or 'screw-step' which displaces the material a short distance axially along the rotating pipe wall. The centrifuging pipe conveyor according to this preferred embodiment can transport granular solids or highly viscous fluids vertically, horizontally, or at any inclination. The design of the present embodiment produces very low frictional losses compared to conventional screw conveyors, and any number of individual modules can be daisy-chained together, with arbitrary, abrupt changes in angle from zero to 180° at each module transition.

Many preferred embodiments of the present invention comprise an outer cylindrical pipe which rotates fast enough for the conveyed material to be held against the outer wall by the centrifugal force of the pipe rotation. Once the material is deposited on the outer wall and held there by the centrifugal force of rotation, a set of blades, or a screw, that is either stationary or moving at a different circumferential speed than the material on the wall is used to deflect the material in an axial direction. The deflecting blades in many preferred embodiments can form a continuous screw or can be a disjointed set of discrete deflectors. As long as the deflecting surface is moving at a different rotational rate than the outer wall, it can be configured to achieve axial displacement of the material. Zero rotations per minute may be the preferred rotation rate for the deflectors in some embodiments.

The exemplary embodiments described in this description are primarily granular-materials applications; however, alternate embodiments and their conveying properties are not limited to granular solids. The same method can be applied in alternate embodiments equally well to a multiplicity of suitable materials including, but not limited to, viscous fluids, mud, sludge, or other difficult to transport materials. The rotation rates and the inclination and the pitch of the deflecting screw or blades may differ somewhat for embodiments implemented to convey viscous fluids; however, the operating principles remain nearly the same. As a practical matter, there is a limit to the viscosity of the 'fluid' that could be handled by these embodiments. For example, without limitation, an extremely viscous material such as, but not limited to, modeling clay or 'play dough' could, in principle, be conveyed by this method; however, the rotation rates required to achieve a centrifuged 'layer' on the outer wall and the torques developed between the deflecting screw and the outer wall would likely make transport of such an extremely viscous materials by this technique prohibitive.

The ability to reliably convey difficult or cohesive materials is a feature of many preferred embodiments of the present invention. Most screw conveyors depend on gravity to provide at least a portion of the resistance to vortex motion of the solids being conveyed, thus, allowing the rotation of the screw to push against the material, and move it axially along the conveying tube. The motivation behind the development of the conveying method in accordance with a preferred embodiment was an analysis of various conveying methods that might be useful for anticipated in-situ resource utilization processes in future lunar missions. The low gravity available on the moon raised questions about the reliability of many conventional conveying methods. Flow tests at reduced gravity, aboard parabolic aircraft flights, confirmed that granular materials are much more difficult to transport under reduced gravity conditions. By utilizing a layer of granular material on the inside of a rapidly rotating pipe, many preferred embodiments of the present invention develop the forces to move material axially along a tube, nearly independent of gravity. Material being centrifuged on the inner wall of the conveying tube in these embodiments have circumferential velocities of at least 0.65 m/s for 5 cm diameter pipes or 1.13 m/s for 15 cm diameter pipes under terrestrial conditions. For lunar applications the velocities are lower. This circumferential velocity represents the speed at which the material would encounter stationary deflecting step screws. The inertia of the granular material at these velocities overcomes weak cohesive forces in the material and enables the material to deform and move in response to the 'encounter' with the stationary screw steps. If more cohesive materials are being conveyed, higher operational rotation rates can be used. Since the rate of rotation is not limited to the minimum speed that enables this technique to function, the standard operating rotation rate of the outer pipe can be increased significantly in many preferred embodiments to overcome the cohesive effects of 'difficult' materials. For specific highly cohesive materials, empirical testing may be needed to establish the minimum centrifuging rotation rate required to obtain reliable conveying behavior. Once this centrifuging rotation rate is determined, the mass flow rate can be separately controlled by any of several other means. For example, without limitation, the mass flow rate could be separately controlled by the feed mechanism, the rotation rate of the inner screw-holding tube or by the tilt angle of the deflecting screw blades depending on which of these features exists in the particular embodiment being used.

Various preferred embodiments of the present invention are most useful for specific applications. Thus, the particular embodiment of the invention that becomes the preferred embodiment depends on several factors, including, but not limited to, the orientation of the conveying anticipated (i.e., horizontal, inclined, vertical), the properties of the material being conveyed (i.e., free-flowing cohesionless, highly cohesive, friable, abrasive, dusty, etc.), and operational requirements such as, but not limited to, a need to be able to stop and start the flow quickly, the ability to vary the mass flow rate separately from the feeding system employed, or the ability to reverse the direction of the flow with or without reversing the direction or speed of rotation of the centrifuging outer cylinder. Varying the conveying orientation (e.g., horizontal, inclined, vertical) requires somewhat different design constraints for each orientation; however, these embodiments are very similar in overall construction, except for feed methods. Some of these different design constraints include without limitation, the minimum operating rotation rate is higher for vertical than horizontal conveying; the ideal or most effective relative rotation rate between the screw blades and the wall is dependent on the orientation; also, whether a continuous or discontinuous screw is the preferred embodiment depends on the orientation (i.e., horizontal, vertical, or inclined). The preferred embodiment for horizontal conveying is comprised of a stationary set of individual step-blades, while the preferred embodiment for vertical conveying utilizes a continuous screw blade rotating faster than the pipe wall.

For horizontal orientations any axial deflection of the conveyed material on the upward traveling side of the pipe-wall has a tendency to slow the material enough that some of it falls away from the rotating wall—this can reduce conveying efficiency. The greater the difference in rotation rate between the rotating pipe and the interior deflecting blade, the greater this effect becomes. For a stationary inner blade or screw, almost any axial slope on the upward traveling side of the rotating pipe-wall will substantially degrade conveyance. Thus, for horizontal conveying, the preferred embodiment of the present invention is a set of deflecting blades all located on the downward traveling side of the pipe rotation. This preferred embodiment for horizontal conveying has the stationary blades located between the 12 o'clock and 6 o'clock positions on a clock-face looking along the pipe axis, with the pipe rotating in a clockwise direction, and the most-preferred embodiment has the blades within the 1:30 and 4:30 o'clock angular range. Horizontal conveying in this preferred embodiment is more efficient than predicted by assuming that the volume of material interacting with a step-screw blade will be deflected axially an distance equal to the axial extent of that step blade. Numerical simulations of the conveying process confirm that the material leaving the lower end of the short inclined blade in this embodiment, continues traveling axially while traveling down the rotating pipe wall. The result is that as much as 50 percent of the material gets carried far enough in the axial direction to reach the step-blade one further along the axis than the next adjacent blade, skipping interaction with the adjacent blade. This results in very efficient axial transport of the conveyed material.

An alternative embodiment which also functions for horizontal conveying utilizes substantially higher rotation rates for the outer pipe wall than the minimum values described by the equations in the Background section, and also has a relatively small differential rotation rate between the inner blades or screw and the outer centrifuging pipe wall. The modest difference in rotation rate allows the axially deflected material to maintain sufficient circumferential velocity for it to stay along the rotating pipe wall even on the upward moving portion of the rotation. For this embodiment there are fewer restrictions on the range of relative rotational velocities that will convey material efficiently if the inner blades or screw is rotating faster than the outer pipe wall. In that case, deflection by the moving screw or blade increases the circumferential velocity of the conveyed material, and thus it increases the centrifugal force acting on the deflected material. This rapidly-rotating horizontal embodiment is not the most preferred embodiment for horizontal conveying; however, for certain materials it may be more reliable than other embodiments and operating conditions.

For vertical conveying having discontinuous blades, with gaps between them, can allow some of the material to fall back down through those gaps if the material is not held continuously against the outer wall by centrifugal forces. Encountering the edge of a discontinuous step-blade can cause a small portion of the material to briefly lose contact with the remainder of the bed of material rotating on the outer wall. Thus, for vertical orientations, the preferred embodiment has a continuous helical screw, or perhaps a continuous ribbon screw blade with steeper slopes over distinct angular ranges, but with no gaps in the ribbon-blade. For vertical orientations, instead of a stationary screw blade, the preferred embodiment operating conditions have the inner blade rotating somewhat faster than the outer pipe-wall so that any deflection from the rotating screw also adds to the circumferential velocity of the material. Such a set of operating conditions for this preferred embodiment allows vertical conveying to remain efficient even when the pipe rotation rate is close to, or even slightly below, the minimum theoretical values that will keep material stationary on the wall (i.e. satisfying the two conditions, $$\frac{\omega_p^2 R_i}{g} > \frac{1}{\tan\phi_r}, \text{ and } \frac{\omega_p^2 R_i}{g} > \frac{1}{\tan\phi_w}),$$

For vertical conveying conditions with the central screw blade rotating slower than the outer pipe wall, a preferred embodiment has a continuous helical screw, and the operating conditions are such that the outer pipe wall rotates significantly faster than the theoretical minimum rotation rates given by the equations in the Background. The extra rotation rate required for efficient operation depends on the difference between the rotation rates of the pipe and the screw. There is a maximum difference between these rotation rates above which the disturbance from the interaction with the inner screw blade interferes too much with the circumferential movement of the material on the wall and conveying ceases to be efficient, or beyond which it may not even function.

If the pipe is oriented horizontally in a preferred embodiment, the screw-step blades are ideally located at an angular location which is just after the centrifuged material has passed the top of the rotating pipe. At this point the normal force is lowest and only a small fraction of the normal weight of the material; therefore, it is very easy to shear and deflect the material in the axial direction. After encountering the short step-screw blade, gravity assists in accelerating the material to recover part of the circumferential velocity component lost when it was deflected axially and the high-g loads at the bottom of the pipe increase wall friction to generally ensure that the material is moving with the wall. In many preferred embodiments implemented for inclined transport, the diverting screw-steps are still most efficient when located circumferentially just after the material has passed its highest point in its circumferential path moving with the rotating pipe wall. For many preferred embodiments implemented for purely vertical (i.e., upward or downward) transport, there is no preferred circumferential location for the step-screw blades. In between the diverting steps, the material rotating with the pipe wall is held in place by a combination of centrifugal force, frictional forces within the granular-material, and frictional forces on the pipe wall. Axial motion only occurs in distinct steps, once per revolution, as the centrifuged material encounters the screw-steps. Centrifuging pipe conveyors according to many preferred embodiments could be used in any solids-transport situation where conventional screw conveyors, bucket elevators, or short conveyor belts are the current transport means being considered. The potential advantages of using these preferred embodiments include, without limitation, simple control of solids flow rates with a minimal set of moving parts and robust operation, even for very cohesive materials.

Those skilled in the art, in light of the present teachings, will readily recognize that a multiplicity of suitable methods can be used in many preferred embodiments of the present invention to feed material into the conveyors. These feeders can be designed to be mechanically coupled with the rotation rate of the pipe or to be independent of the pipe rotation rate. Examples shown in this description are not intended to be limiting, but to be illustrative of types of feeder mechanisms that could be used with the conveying systems. Likewise, it is possible to devise appropriate alternative chutes and deflectors in many preferred embodiments, separate for each direction of transport but automatically selected by the flowing solids, so that a single conveyor, equipped with tilting deflector blades, could have the solids flow stop, and even completely reverse, simply by changing the tilt angle of the set of deflector blades without altering the rotation rate or direction of the outer centrifuging pipe.

Figure 1B:
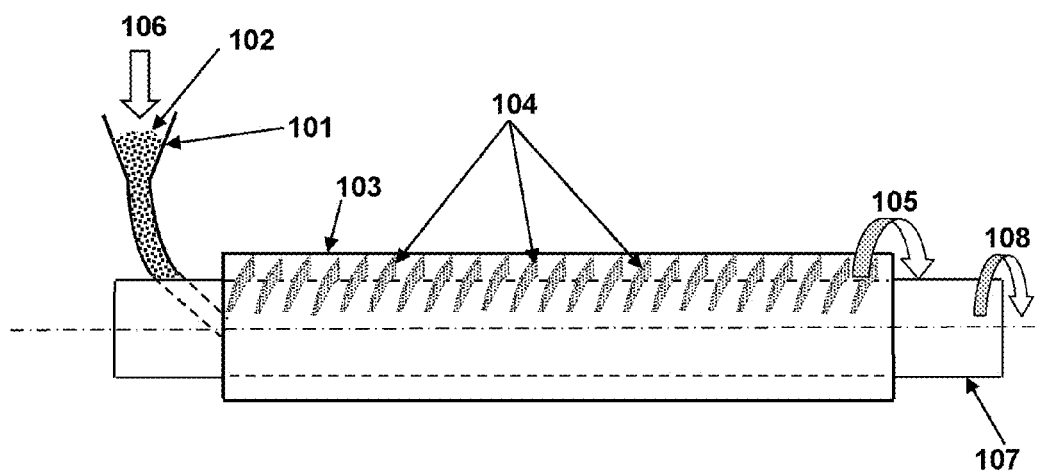
Figure 4A:
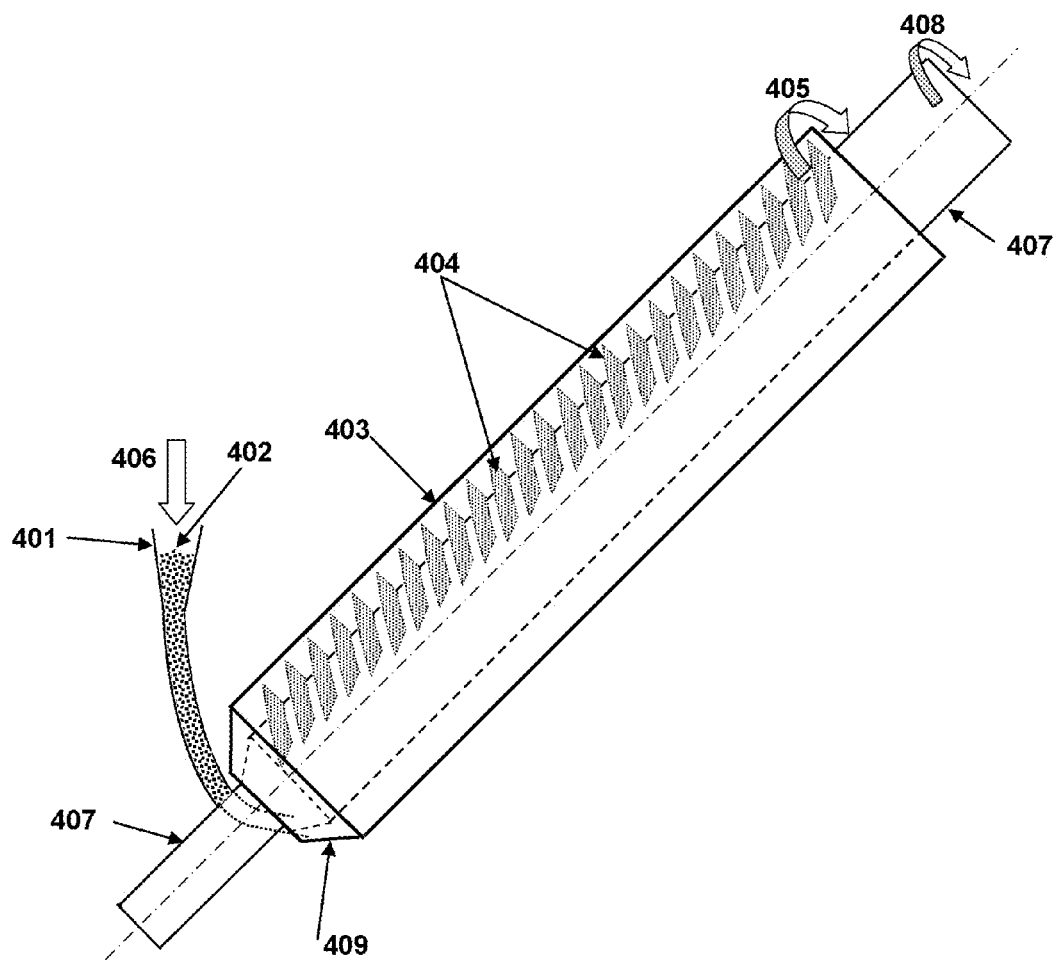
FIG. 4A is a schematic side view of an exemplary conveyor system in a configuration similar to the embodiment illustrated by way of example in FIGS. 1A and 1B with a conveying pipe oriented at a relatively steep inclination for transporting material simultaneously in both the horizontal and vertical directions, in accordance with an embodiment of the present invention.
Figure 4B:
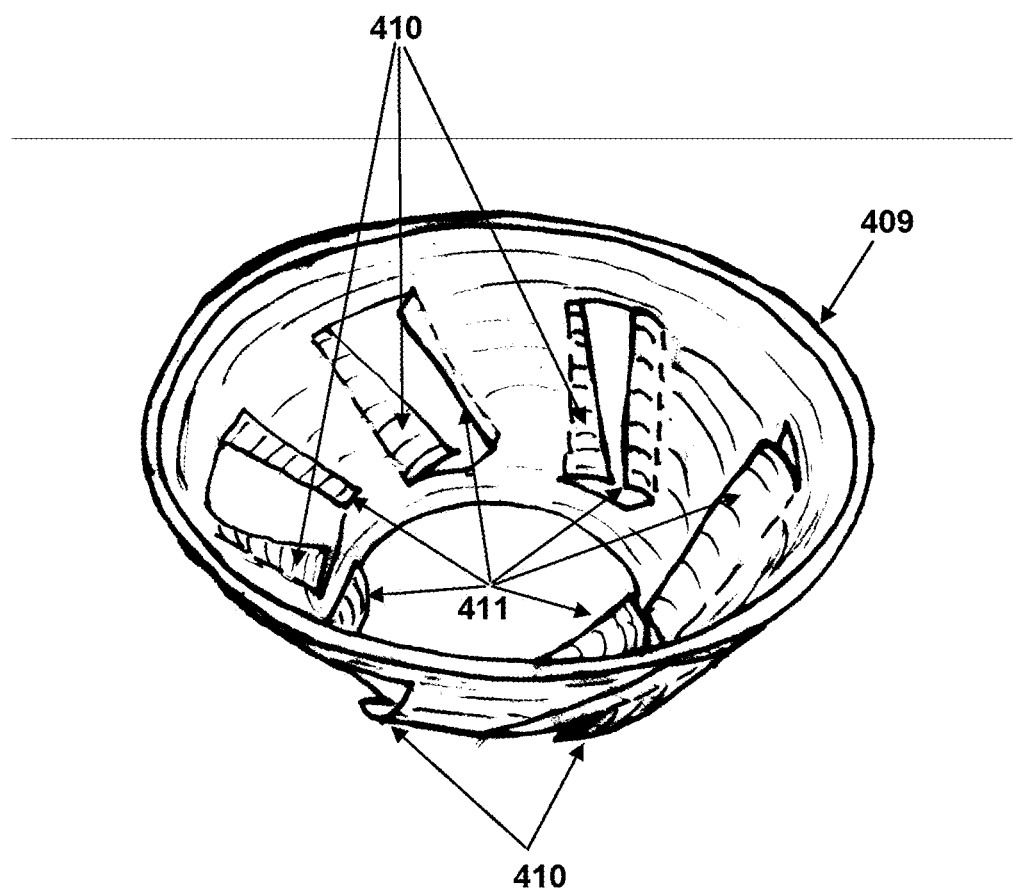
FIG. 4B illustrates one embodiment of a conical feeder that can be utilized to supply material to the conveyor in steeply inclined or vertical orientations of the present invention.

FIGS. 1A and 1B illustrate an exemplary granular material conveyor system in a horizontal conveying orientation, in accordance with an embodiment of the present invention. FIG. 1A is a cross sectional front view, and FIG. 1B is a cross sectional side view. In the present embodiment, the conveyor system comprises an inlet feed apparatus 101 which receives granular material 102 from a reservoir (not shown) and can supply granular material 102 to the inlet of a centrifuging screw conveyor pipe 103 in such a manner that the velocity of granular material 102 at the inlet is within a factor of two or so of the circumferential surface velocity of the rotating outer wall of conveyor pipe 103, in order to minimize frictional losses and to ensure that the material attains the pipe-wall speed within one revolution. A multiplicity of suitable means may be used for inlet feed apparatus 101 such as, but not limited to, chutes or funnels, or through the use of tapered conical sections, an example of which, 409, is shown in FIG. 4A, or with nearly axial internal blades that assist in accelerating the material up to the pipe-wall speed, as illustrated in FIG. 4B. Cylindrical conveyor pipe 103 rotates fast enough that the centrifugal acceleration on the inside of the outer wall is somewhat greater than the acceleration of gravity, which enables conveyor pipe 103 to 'centrifuge' granular material 102 onto the outer wall of conveyor pipe 103. In the centrifuging state, granular material 102 is primarily deposited as a relatively thin layer on the pipe wall and held there as a nearly static layer by the centrifugal force from the rotation of conveyor pipe 103.

An evenly spaced set of tilted deflector blades 104 is located in such a manner along a single line parallel to the axis of conveyor pipe 103 that deflector blades 104 are near the wall of rotating conveyor pipe 103 with their outer edges generally curved to follow the curvature of the pipe wall. Each deflector blade 104 is positioned so as to intersect the circumferentially traveling granular material 102 rotating with the wall of conveyor pipe 103 and deflect it a small distance in the axial direction along the pipe wall as material 102 passes by each deflector blade 104, while allowing material 102 to maintain a circumferential velocity component that is close to the centrifuging velocity of the wall of conveying pipe 103. The axial spacing between successive deflector blades 104 is such that granular material 102 deflected by one blade 104 travels in the axial direction far enough before coming to rest, with respect to the rotating pipe wall, so that material 102 can be deflected by, or will intersect, the next blade 104, and thus material 102 moves axially along the wall of conveying pipe 103 in a series of discrete steps as it passes successive deflector blades 104, preferably one for each revolution around the axis. In alternate embodiments In the present embodiment, deflector blades 104 are attached to a rotating inner cylinder 107 coaxial with conveyor pipe 103 rotating in such a manner that the entire deflector blade assembly can be rotated at an independently controlled rate of rotation 108 which can be slower than, the same as, or faster than a rate of rotation 105 of conveyor pipe 103, while maintaining the close proximity of the blades to the outer pipe wall. By varying rate of rotation 108 of inner cylinder 107, the mass flow rate of the conveyor system can be precisely adjusted, stopped, or reversed, without changing the rotation rate of conveyor pipe 103. When rotation rate 108 of inner cylinder 107 is somewhat slower than rotation rate 105 of outer conveyor pipe 103, material 102 moves in an axial direction to the right of inlet feed apparatus 101. Alternatively, inner cylinder 107 may be rotating somewhat faster than conveyor pipe 103 for transport of material 102 in the opposite axial direction along pipe 103.

In an alternate operating condition for this embodiment, the deflection blades may be stationary by having the inner cylinder 107 stationary. In some embodiments with stationary deflector blades, the deflector blades may have a variable tilt angle. Some embodiments with rotating deflector blades may also have a variable tilt angle. In these embodiments, as illustrated by way of example in FIG. 6, the angle of tilt of the entire set of deflector blades can be simultaneously and dynamically adjusted while the conveyor pipe is rotating and material is being conveyed through the conveyor pipe. Changing the tilt angle of the deflector blades can change the axial rate of travel of the material in the conveyor pipe, stop all axial travel, or reverse the direction of axial travel of the material on the pipe wall, all without changing the rotation speed or direction of rotation of the conveyor pipe.

In typical use of the present embodiment, a granular material 102 is poured through inlet feed apparatus 101 into one end of rapidly rotating horizontal conveyor pipe 103, and deflector blades 104 successively deflect centrifuging material 102 through a series of steps, moving material 102 sequentially along the wall of conveyor pipe 103 in the axial direction and eventually out the opposite end of conveyor pipe 103. During the conveying process, material 102 is simultaneously pushed against the outer wall of conveyor pipe 103 by centrifugal forces and transported axially by deflector blades 104.

Generally, in the present embodiment and in some other preferred embodiments of the present invention, the rotation rate of pipe 103 is such that the centrifugal acceleration on the outer wall is greater than the acceleration of gravity; however, the centrifugal acceleration is usually no more than five times the acceleration of gravity, and for many materials the centrifugal acceleration may be between 1.2 and two times the acceleration of gravity. More specifically, the rotation rate of the centrifuging pipe in many preferred embodiments is such that the centrifugal acceleration on the outer wall is preferably greater than 1.4 times the acceleration of gravity for horizontal conveying and preferably greater than 1.7 times the acceleration of gravity for vertical and steeply inclined conveying. Rotation rates which produce centrifugal forces this strong cause the bed of granular material on the pipe wall to have sufficient strength, due to its self-compaction against the wall, to resist deforming and flowing down the wall in response to gravity. Likewise, the normal-direction wall force from the centrifugal acceleration of the material on the wall creates wall friction forces which can resist sliding down the wall. Thus, at rotation rates which are fast enough to create centrifugal accelerations at least this great, the granular material can form a stable static bed on the rotating pipe wall. At lower rotation rates some of the material will slide down the vertical, or nearly vertical, pipe wall, and the conveying may become inefficient, or physically impossible. Very low pipe wall friction or very low internal friction in the granular material will cause the minimum rotation rate for conveyance to be higher. However, it is contemplated that the rotation rate of the conveyor pipe may vary depending on the application of the system, for example, without limitation, higher rotation rates may be utilized in some embodiments to increase overall granular material throughput or to the allow conveyance of more cohesive materials.

The preferred tilt angle of the deflector blades may be different depending on whether the design is for blades that are stationary or rotating on an interior tube or mounting structure. Generally, as in the present embodiment, the tilt of blades 104 is between 2 and 60 degrees from a plane perpendicular to the center axis of conveyor pipe 103, more preferably between 5 and 45 degrees from the perpendicular plane and even more preferably between 10 and 30 degrees from this perpendicular plane. Short blade segments can have slopes greater than 45 degrees from the perpendicular plane; however, continuous or constant-pitch screw blades, such as helicoids, will typically not convey material if the slope at the outer wall exceeds 45 degrees by very much. If the tilt of the blades (or pitch of the screw) is too high, the material will not slide along the screw or blade face and no conveyance will occur. The exact maximum angle that will convey material depends on the wall friction coefficient, the material internal shear resistance, the relative rotation-rate difference between the wall and the screw, and the absolute rotation rate of the pipe wall. Very shallow tilts or screw-pitch values are avoided because they make the overall path the material follows (as it traverses a helical movement along the pipe wall) longer and thus less efficient than steeper inclinations. The deflector blades in alternate embodiments are not restricted to be planar, or to have only one angle of slope. For example, without limitation, the deflector blades in one alternate embodiment may be sections of a screw helicoid, or, in another alternate embodiment, the blades may have a variable slope (i.e., may be curved similar to a ski jump or have two or more tilt angles) starting out parallel to the plane perpendicular to the inner cylinder and gradually increasing in slope to an angle exceeding 45 degrees from the plane perpendicular to the inner cylinder. Preferred embodiments typically have ending slopes less than 45 degrees from the plane perpendicular to the inner cylinder, so as to maintain sufficient circumferential velocity after deflection for the centrifugal forces to keep the material on the rotating outer wall.

In the horizontal conveying orientation of one preferred embodiment of the present invention with stationary deflector blades, the defector blades are preferably located at approximately the 1:30 o'clock to 4:30 o'clock position around the periphery of the conveyor pipe. This configuration has significantly lower frictional losses than conventional screw conveyors. This reduced friction is a result of the fact that gravity lowers the normal force of the granular material on the outer wall in the upper half of its path around the circumference, and by selectively placing the transporting deflector blades at azimuthal positions where the normal force on the wall is reduced and where gravity accelerates the material in the circumferential direction, the transport process is significantly assisted by gravity, as well as having lower frictional losses. Embodiments in which the deflector blades are located at azimuthal positions near 1:30 o'clock may also be used for inclined conveying of granular material in order to take advantage of the assistance of gravity in deflecting the material in the axial direction. In the vertical orientation, many preferred embodiments of the present invention may have power or torque requirements comparable to those of conventional screw conveyors; however, these embodiments are much more robust for cohesive materials than conventional conveyors.

Practitioners familiar with rotating drum flows will recognize that the power required to rotate a horizontal cylinder that is partially filled with a granular solid usually depends on the degree of filling, the angle of repose of the material and the rotation rate of the cylinder. For slow rotations the granular material gradually rides up on the up-traveling wall of the cylinder and then, once the tilt of the top surface of the slowly rotating granular material exceeds its angle of repose, the top surface cascades down the top face of the material to the other side of the cylinder. As the rotation rate increases, the material rides up higher on the rising side of the cylinder and the power required to produce the rotation increases significantly. At higher rotation rates the material is carried into ballistic trajectories, and at still higher rotation rates the material remains centrifuged to the outer wall. Once the cylinder is rotating fast enough for the material centrifuged onto the outer wall to maintain itself as an essentially-static bed on the rotating wall, usually requiring rotation rates that produce centrifugal accelerations exceeding gravity by 40% to 70% or more, the rotating granular material does not cause or contribute to any significant power losses. The only power required to maintain the rotation under these centrifuging conditions is that required to overcome the frictional losses in motors, bearings, gears and drive mechanisms, and the losses to air resistance with the surrounding stationary atmosphere. Thus, there are no frictional losses due to the granular material rotating as a 'static' centrifuged layer on the wall of the rotating cylinder; only inherent losses that would be required to maintain rotation of a solid pipe occur. Similarly, granular material centrifuged onto the wall of a vertical rotating pipe, which is rotating fast enough so that the static friction created with the wall generally prevents the material from sliding down the pipe wall, also exhibits no frictional losses as it rotates as a 'static' bed on the outer wall. Only the losses associated with maintaining the pipe rotating take power unless the material is also being conveyed.

The rotation rates required to attain static centrifuged beds on the wall of horizontal or vertical pipes are not excessive, and are well within the range of rotation rates used for conventional enclosed screw conveyors in near-vertical orientations. For materials with an angle of repose equal or greater than 20 degrees and using wall material with wall friction angles exceeding 20 degrees (e.g., a wall friction coefficient exceeding 0.36), a vertically oriented centrifuging pipe must have centrifugal accelerations exceeding 1.7 g (i.e., 16.7 m/s$^2$) in order to generally prevent any downward sliding of the granular material on its walls. The Table 1 lists the RPM level required to attain that level of centrifugal force as a function of pipe diameter. Wall friction angles for most granular materials on stainless steel sheet metal, for instance, have values greater than 22 degrees (i.e., wall friction coefficients of greater than 0.4). Some plastics, such as Teflon, and smooth spherical particles, may exhibit friction angles as low as 6 degrees or have corresponding wall friction coefficients as low as 0.1. The 20 degree friction angle and 20 degree angle of repose values assumed for these example cases, are smaller than would be expected for most mineral, sand or geologic materials, but may be higher than some organic materials like plastic pellets or soy beans. For lower friction or angle of repose materials the rotation rates required for a stationary bed are higher.

TABLE 1

| Diameter (inches) | Diameter (centimeters) | Rotation rate (RPM) | Circumferential wall speed (m/s) |
| --- | --- | --- | --- |
| 2 | 5.1 | 245 | 0.65 |
| 3 | 7.6 | 200 | 0.80 |
| 4 | 10.2 | 173 | 0.92 |
| 6 | 15.2 | 141 | 1.13 |

Figure 2A:
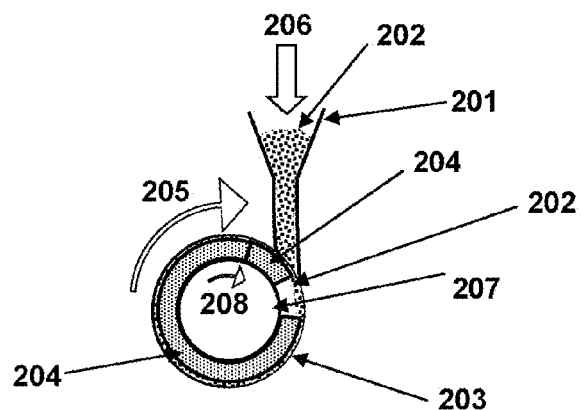
FIGS. 2A and 2B illustrate an exemplary granular material conveyor system in a horizontal conveying orientation, in accordance with an embodiment of the present invention.
Figure 2B:
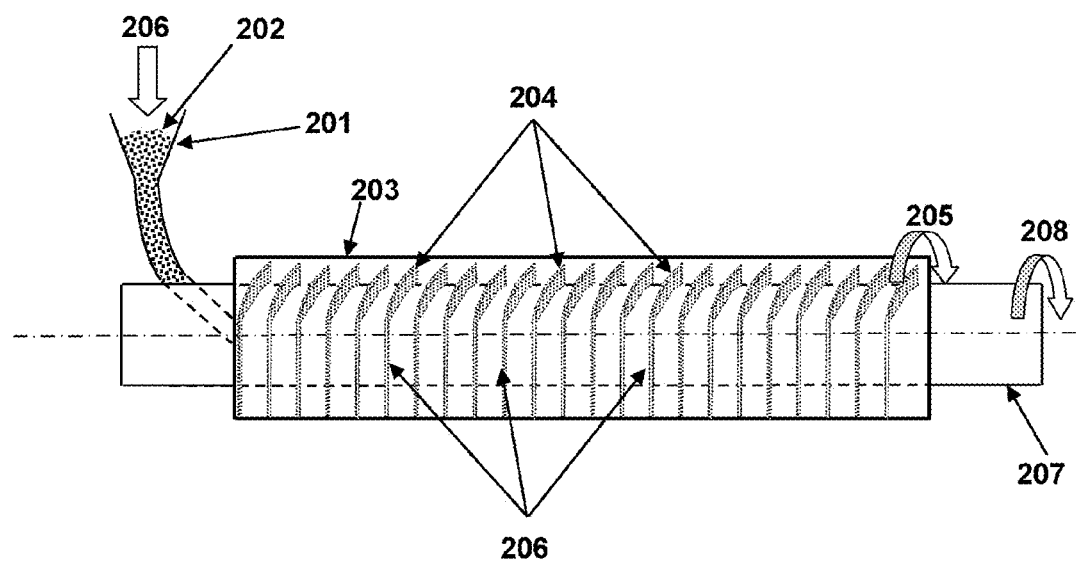

FIGS. 2A and 2B illustrate an exemplary granular material conveyor system in a horizontal conveying orientation, in accordance with an embodiment of the present invention. FIG. 2A is a cross sectional front view, and FIG. 2B is a cross sectional side view. In the present embodiment, the conveyor system comprises an inlet feed apparatus 201 which receives granular material 202 from a reservoir (not shown) and supplies granular material 202 to the inlet of a centrifuging screw conveyor pipe 203 and an evenly spaced set of tilted angle deflector-blades 204. In this embodiment each tilted blade 204 comprises a continuous extension of a flat washer-like annulus 206, which has one end bent or tilted to form the deflecting region of blade 204. Each flat annulus 206 attached at the same axial position at one end of each deflector blade 204 may extend nearly all of the way around the circumference of an inner cylinder 207, as long as a large enough circumferential gap is maintained at the end of each annulus 206 to enable granular material 202 to move from one deflector blade 204 to the next. Generally, tilted blade 204 extends for preferably 30 to 90 degrees around the periphery of inner cylinder 207, with the remainder of the circumference making up annulus 206 flat. However, in alternate embodiments the tilted section may be larger or smaller. In the present embodiment, each combined flat annulus 206 and tilted blade 204 is a separate, independent ring; however, in alternate embodiments each tilted section may further be joined to the next flat annulus section so as to form a single continuous ribbon blade which has alternate flat and tilted sections.

The present embodiment may be preferable for vertical conveying orientations since, in the event of an emergency shut down or mechanical failure of the drive mechanism, flat annuluses 206 could generally prevent material 202 from flowing out the bottom of conveyor pipe 203 when in a vertical orientation. In the present embodiment, inner cylinder 207 can be rotated independent of the rotation of conveyor pipe 203; however, in alternate embodiments this cylinder and the attached blades may be stationary. The option of allowing independent rotation of the inner deflector blade assembly is particularly useful for a vertically oriented conveyor utilizing full ring deflectors as in the present embodiment, since material 202 that might build up on flat annuluses 206 in say an emergency shutdown can be redeposited on the outer wall of conveyor pipe 203 by simply rotating the inner and outer assemblies together until centrifuging conditions are established. Once material 202 is redeposited on the outer wall of conveyor pipe 203, inner cylinder 207 with annuluses 206 and tilted deflector blades 204 can be slowed down or sped up to effect the conveyance of material 202. Allowing the inner assembly to rotate creates another control parameter. If the inner blade assembly is stationary, one rate of conveying is achieved. If a rotation rate 208 of the inner assembly is equal to a rotation rate 205 of conveyor pipe 203, the axial flow stops. In addition, if rotation rate 208 of the inner blade assembly is faster than rotation rate 205 of conveyor pipe 203, the direction of axial transport is reversed. Such flexibility might be very useful for staged shut down and cleanout of conveyor pipe 203, especially if the equipment down-stream from the conveyor system experiences mechanical problems and it is desired to have the system emptied of all granular material 202 in a controlled manner without sending any more material 202 to the down-stream equipment.

Figure 3A:
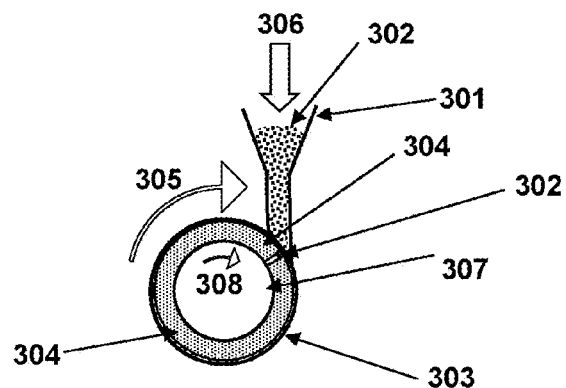
FIGS. 3A and 3B illustrate an exemplary granular material conveyor system in a horizontal conveying orientation, in accordance with an embodiment of the present invention.
Figure 3B:
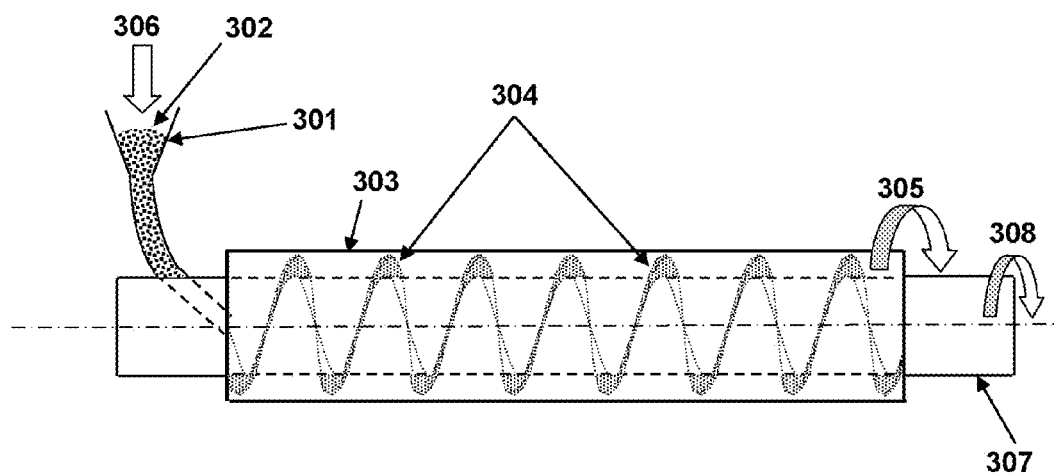

FIGS. 3A and 3B illustrate an exemplary granular material conveyor system in a horizontal conveying orientation, in accordance with an embodiment of the present invention. FIG. 3A is a cross sectional front view, and FIG. 3B is a cross sectional side view. In the present embodiment, the conveyor system comprises an inlet feed apparatus 301 which receives granular material 302 from a reservoir (not shown) and supplies granular material 302 to the inlet of a centrifuging screw conveyor pipe 303. A series of tilted blades are joined together to form a continuous ribbon screw blade 304 with a continuous tilt from a circumferential plane along the entire axis of the conveyor, similar to a conventional helical screw blade. In some alternate embodiments the blades may be joined together to form one continuous ribbon blade with azimuthally varying inclination or tilt angle with steeper and shallower slopes on different sections around the circumference.

This configuration is most appropriate when screw blade 304 and a supporting inner cylinder 307 are rotating at a rotation rate 308 that is a somewhat different speed than a rotation rate 305 of conveyor pipe 303. For embodiments that are intended to handle highly cohesive or highly viscous materials, the flexibility of enabling the inner blade assembly to rotate with independent control can be particularly useful. For cohesive materials, rotation rates which are significantly higher than the minimum to create centrifuging conditions may be required in order for the interaction of screw blade 304 and the centrifuged material to deform and axially displace the cohesive material. The conveying rate of material 302 is determined by the difference in rotation rate 305 of conveyor pipe 303 and rotation rate 308 of inner cylinder 307. The degree of cohesion that can potentially be handled by the conveyor system is determined by the absolute rotation rate 305 of conveyor pipe 303 and by the torque level that can be developed between conveyor pipe 303 and inner cylinder 307 by the drive mechanism.

Those skilled in the art, in light of the present teachings, will readily recognize that various different embodiments of the present invention may be implemented with different shapes of blades or different fixed arrangements of blades. For example, without limitation, some alternate embodiments comprise a centrifuging conveyor pipe wherein the deflector blades are not located along a single line parallel to the axis of the conveying pipe. Rather, these deflector blades are located along two or more separate parallel lines at different azimuthal angles around a central mounting cylinder, or the blades may be arranged equally spaced on a spiral path along the pipe axis, or in a multitude of other regular geometric spacings along and/or around the conveying pipe geometry. Some of the more obvious arrangements are included in the embodiments described; however, depending on material properties, better conveying may be obtained with geometric spacing and combinations of components which differ from those described in this limited subset of possible embodiments.

It is contemplated that a multiplicity of suitable apparatuses and methods may be employed to feed material into the receiving end of the centrifuging conveyor systems according to many preferred embodiments of the present invention. For example, without limitation, those illustrated by way of example in FIGS. 4-5B. For vertical or steeply inclined orientations there are a variety of specialized feeding apparatuses and methods which could be used, such as the Siwertell rotating scoop feeder (patented in 1974 in Sweden by O. Siwersson and G. Tell, and currently in use in ship unloading conveyors manufactured by Cargotec Sweden AB). Alternative rotating scoop feed designs consisting of larger radius scoop-sections as part of the outer rotating cylindrical pipe wall near the open entrance end, as described in the "Olds" patent (U.S. Pat. No. 7,314,131 B2), could be used to feed material to the pipe wall. The Olds patent describes a multitude of ways to control the size of the scoop openings in order to control the feed rate to the conveyor. Alternatively, a new feed-scoop design, constructed by adding external scoops to the tapered conical feed section, 409, shown in FIGS. 4A & 4B. In this conical feeder, 409, the material is scooped into the cone by the external larger radius scoops, 410, and is further guided directly to the cylindrical pipe wall through a combination of nearly axial tapered inner tilted blades, 411, and the centrifugal force due to the rotation of the conical feeder, 409.

It is desirable to have the material enter the rotating pipe with a translational velocity that is in the same direction as the circumferential wall velocity of the rotating pipe. It is preferred that the material enter the rotating pipe with a circumferential velocity component that is nearly the same as that of the rotating pipe. For horizontal conveying orientations, the entrance is preferably onto the downward traveling wall of the pipe entrance. This allows the material to experience a region of twice-gravity normal force at the bottom of the pipe during its first rotation cycle, while the material is accelerating and/or adjusting its velocity to match the wall speed of the rotating pipe and before encountering the first deflector blade. Having material enter the rotating pipe on the downward traveling side allows the material to enter at a substantially lower speeds than the wall speed, and still attain sufficient velocity due to friction in the 2-g bottom portion of the cycle for the material to remain on the wall of the conveyor pipe during its entire first revolution in the pipe. This allows the preferred condition of having the velocity of material entering the pipe match the pipe-wall velocity to be relaxed somewhat and still have the conveyor function appropriately.

FIG. 4A is a schematic side view of an exemplary conveyor system in a configuration similar to the embodiment illustrated by way of example in FIGS. 1A and 1B with a conveyor pipe 403 oriented at a relatively steep inclination for transporting material 402 simultaneously in both the horizontal and vertical directions, in accordance with an embodiment of the present invention. In the present embodiment, the conveyor system comprises an inlet feed apparatus 401 which receives granular material 402 from a reservoir (not shown) and can supply said granular material 402 to the inlet of centrifuging screw conveyor pipe 403. An evenly spaced set of tilted deflector blades 404 is located along a single line parallel to the axis of conveyor pipe 403 on an inner cylinder 407.

In the present embodiment, the conveyor system comprises one of several possible configurations for inlet flow geometry which could be used for inclined conveying. For inclined orientations, similar criteria exist for preferred the entrance velocity of granular solids 402 as in horizontal orientations. However, the inclined position of conveyor pipe 403 makes it possible for some of material 402 to escape out the inlet end of conveyor pipe 403. A tapered end-piece 409 assists in providing a smooth entry and generally preventing any loss of material 402 out of the inlet of conveyor pipe 403 during the acceleration of material 402 and adjustment to centrifuging. In alternate inclined orientations and especially for steep inclinations it is contemplated that various different means may be used to provide preferred inlet flow geometry such as, but not limited to, additional barriers or tapered partial-end-pieces. FIG. 4B shows the detail of a modification of the tapered inlet conical section, 409, suitable for converting that inlet section into a feeder for very steep inclinations. In this embodiment, inlet scoops, 410, are placed in the tapered conical inlet section, 409, and tilted, but nearly axial blades, 411, are located on the inside of the conical section, 409, to accelerate the incoming material up to the pipe-wall speed.

Figure 5A:
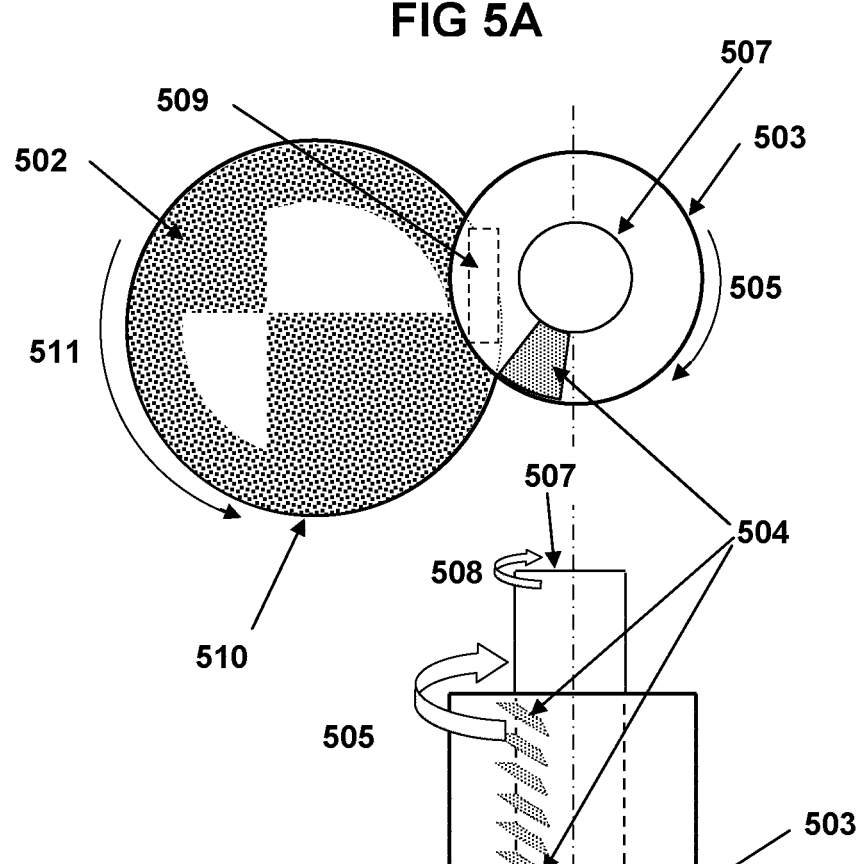
FIGS. 5A and 5B illustrate an exemplary centrifuging screw conveyor system similar to the embodiment shown by way of example in FIGS. 1A and 1B with a conveying pipe oriented vertically, in accordance with an embodiment of the present invention.
Figure 5B:
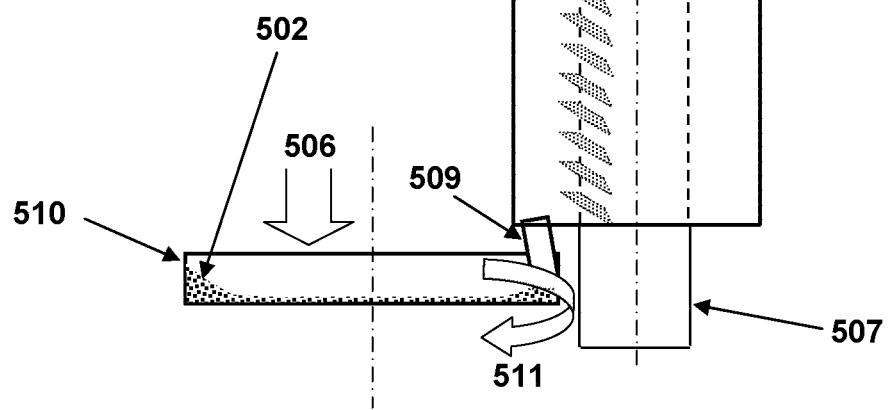

FIGS. 5A and 5B illustrate an exemplary centrifuging screw conveyor system similar to the embodiment shown by way of example in FIGS. 1A and 1B with a conveying pipe 503 oriented vertically, in accordance with an embodiment of the present invention. FIG. 5A is a front view, and FIG is a cross sectional side view. In the present embodiment, the conveyor system comprises an inlet feed apparatus 501 which receives granular material 502 from a reservoir (not shown) and can supply said granular material 502 to the inlet of centrifuging screw conveyor pipe 503. An evenly spaced set of tilted deflector blades 504 is located along a single line parallel to the axis of conveyor pipe 503 on an inner cylinder 507.

In the present embodiment the conveyor system comprises an exemplary method to feed granular material 502 into the bottom of the rapidly rotating outer conveyor pipe 503 so that entering granular material 502 has a circumferential velocity close to a wall speed 505 of conveyor pipe 503. For vertical conveying orientations, it is also possible to utilize a separate active feed mechanism to deliver material into the inlet of the conveyor pipe. The mechanism shown in the present embodiment comprises a rotating open-topped pan 510 into which granular material 502 is poured from a reservoir (not shown). The rotation of pan 510 centrifuges granular material 502 to the outer wall of pan 510 where a stationary deflector blade 509 diverts material 502 upward into the rotating conveyor pipe 503. A rotation rate 511 and diameter of rotating pan 510 can be selected so that material 502 delivered to the lower inlet of conveyor pipe 503 arrives with a velocity that is close to rotational wall velocity 505 of conveyor pipe 503. Rotating pan 510 and conveyor pipe 503 are rotating in opposite directions so that the direction of material 502 matches that of conveyor pipe 503 as it exits pan 510. Tests with inclined and near-vertical configurations have indicated that a series of short blades such as those illustrated in FIG. 4A and FIG. 5 may require higher pipe rotation rates than a continuous screw or ribbon blade, such as that shown in FIG. 3B. Also, preferred embodiments and operating conditions for steep inclinations and vertical conveying would have the inner blades or continuous screw blade rotating at a higher rotational velocity than the outer pipe wall.

Figure 6:
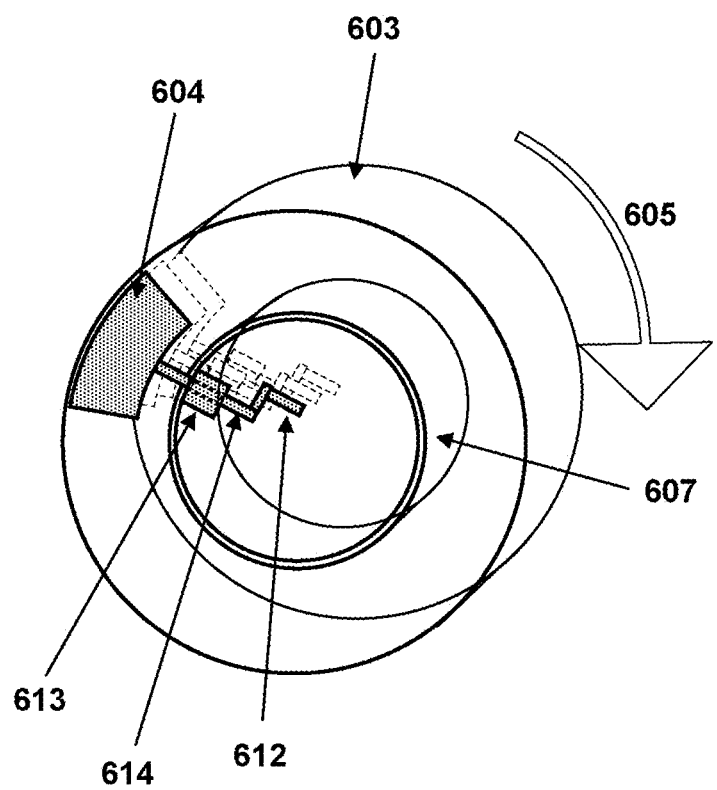
FIG. 6 is a transparent front perspective view of an exemplary centrifuging pipe conveyor system, in accordance with an embodiment of the present invention.

FIG. 6 is a transparent front perspective view of an exemplary centrifuging pipe conveyor system, in accordance with an embodiment of the present invention. In the present embodiment each deflector blade 604 is mounted to a stationary central structure 607 with an adjustment means 613 such as, but not limited to, a bearing or a hinge, that enables the degree of tilt of blade 604 to be changed. A mounting shaft 614 of blade 604 extends into the interior of central structure 607 where a means of delivering the rotation is applied. In the present embodiment a crank handle 612 is illustrated at the end of shaft 614; however, alternate embodiments may comprise various different means of delivering the rotation to the blades such as, but not limited to, dials, levers, motors, etc. By connecting crank handles 612 of each blade 604 together with connection means such as, but not limited to, a chain, wire, rod, etc., all of the individual angles of blades 604 may be simultaneously changed to a new tilt angle. By adjusting the tilt angle of all of deflector blades 604, the mass flow rate being conveyed in a conveyor pipe 603 can be adjusted; for example, without limitation, the conveying may be stopped or started, almost instantaneously by one simple motion such as, but not limited to, pushing a rod or pulling a chain without modifying a rotation rate 605 or rotation direction of conveyor pipe 603. In an alternate embodiment, each deflector blade may be individually adjustable.

Since placing or pouring material into the entrance of a horizontal centrifuging conveying pipe is simpler than feeding it into a vertically oriented conveyor, it should be noted that one of the benefits of many preferred embodiments is that at the exit of this type of conveyor, the granular material exiting the conveyor pipe has a significant translational velocity, probably exceeding the minimum values listed in TABLE 1 for various diameter centrifuging conveyor pipes. As the material exits the conveyor pipe, a stationary deflection blade or chute can be placed so as to redirect the exiting material in almost any direction. Through judicious placement of such a chute, at a particular angular location around the periphery of the pipe exit, the direction of the prevailing speed of the pipe-wall can be made to vary by 360 degrees. A chute that diverts the material out of plane by 30 to 45 degrees would function just as the individual deflector blades of the conveyor. Thus, by judicious selection of the location and orientation of a simple tilted and/or curved exit blade, or chute, the exiting material can be directed in almost any direction and still have a translational speed close to that of the wall of the rotating conveyor pipe. In this manner, for almost any angle of orientation of a succeeding conveying module, it is possible to place a simple diverter blade at the exit of the preceding module which would deliver flowing granular material at almost the perfect speed and direction to begin centrifuging on the wall of a follow-on conveying module.

Curved transfer chutes are a common method of transferring granular solids from one conveyor belt to another in the mineral industry, and they are often designed to deposit the material onto a follow-on belt at a velocity close to the belt surface speed in order to minimize belt wear. Design of similar-function transfer chutes is simpler here, since the velocity of the solids is already nearly the exact value needed for the next leg, and the direction of the tangential velocity varies over a 360 plane. Thus, only a small angle change is required to achieve nearly perfect matching of the material velocity and the wall velocity of a follow-on conveying pipe.

This ability to have the exiting material go in almost any direction traveling at a speed that is close to the wall speed of a centrifuging pipe conveyor enables material exiting one centrifuging pipe conveyor to be readily fed into the entrance of another adjacent pipe conveyor and oriented in any spatial direction, even 180-degrees from the original conveying direction. Thus, any horizontal conveying leg could become the 'active' feeder for a following horizontal, inclined or vertical centrifuging conveyor pipe. By this means any series of centrifuging conveyor pipes could be daisy-chained together to form a conveying path of unlimited length. In order to avoid excessive tolerance buildup, or other mechanical support issues, there may be practical reasons to design individual centrifuging conveying pipe sections as relatively short pipes, for example, without limitation, 10 ft lengths (i.e., approximately 3 meters each). Longer conveying lengths can be readily achieved by daisy-chaining successive centrifuging conveying pipes with a small gap between adjacent modules to provide a location for the supports for the inner deflector blades. The drive mechanism for the outer rotation can be delivered through various different means such as, but not limited to, driven wheels, gears, or chain sprockets on the outside of the conveying pipe. If the application requires separate rotation of the inner deflector blade assembly, the segmented and daisy-chained design provides a relatively simple means to apply bearings and drive mechanisms to the inner blade assemblies at regular intervals along a planned conveying path. Using such a daisy-chained assembly of conveying segments, it is easy to have arbitrary and abrupt changes in the direction of conveying between any segments. These changes in direction for each succeeding module could be, for example, without limitation, 45-degrees, 90-degrees or even 180-degrees from the direction of the previous module, and each segment could be oriented at any inclination from straight up to straight down, as well being able to point in any horizontal direction desired.

Figure 7:
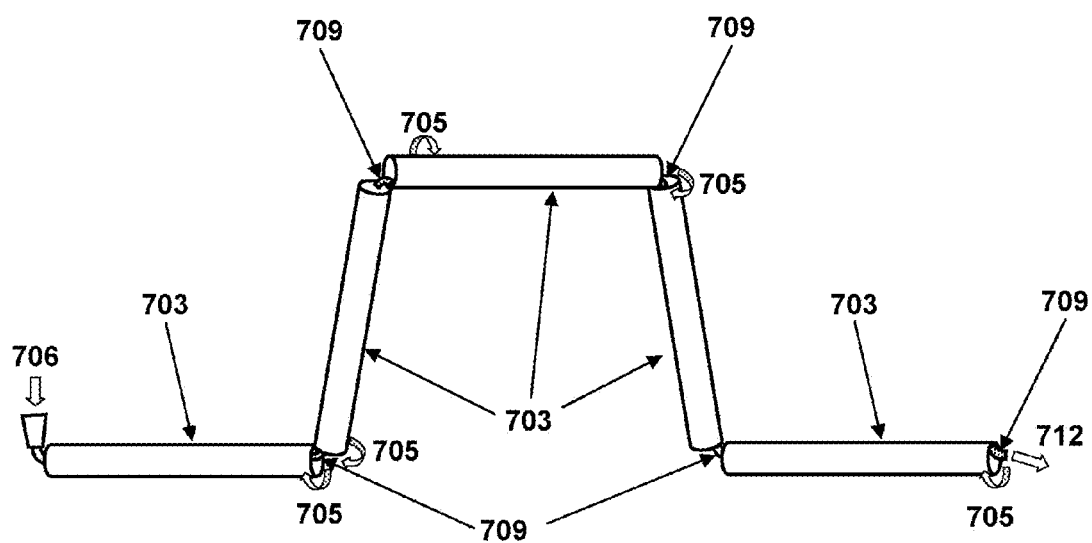
FIG. 7 is a diagrammatic front view of an exemplary a series of centrifuging pipe conveyors daisy-chained together to form a long conveying path, in accordance with an embodiment of the present invention.

FIG. 7 is a diagrammatic front view of an exemplary a series of centrifuging pipe conveyors 703 daisy-chained together to form a long conveying path, in accordance with an embodiment of the present invention. In the present embodiment, the series of centrifuging pipe conveyors comprises arbitrary changes in conveying direction between individual conveying modules. In this figure the material to be conveyed enters an inlet 706 at the left end and exits through an outlet 712 at the right. Each centrifuging pipe conveyor 703 is rotating about its own axis at a rotation rate of 705 where the rotation rates and diameters for each section can be the same, or can be independently selected. For example, in the vertical or near-vertical sections, the rotation rate might be set higher, or a different embodiment, with a rotating inner screw, might be utilized, while horizontal sections might utilize stationary step-screw blade sets. At the end of each conveyor 703 a transfer deflector-blade or chute 709 transfers the material to the next conveyor 703 in such a manner that the incoming velocity of the material is already nearly equal to the wall speed of the centrifuging pipe conveyor 703.

Having fully described at least one embodiment of the present invention, other equivalent or alternative methods of providing a granular material conveyor system according to the present invention will be apparent to those skilled in the art. The invention has been described above by way of illustration, and the specific embodiments disclosed are not intended to limit the invention to the particular forms disclosed. For example, the particular implementation of the inner cylinder may vary depending upon the particular type of blades used. The inner cylinders described in the foregoing were directed to implementations with relatively large diameters with respect to the blades; however, similar techniques are to provide inner cylinders with smaller diameters to accommodate larger blades. Larger-bladed implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
    means for rotating about a longitudinal axis with a rotational rate at least sufficient for a cohesive material, fed into said rotating means, to remain substantially stationary in a layer on an interior of said rotating means;
    means for deflecting the cohesive material along said interior;
    means for supporting said deflecting means within said interior along a line at a fixed distance from a longitudinal axis of said rotating means, said means for supporting being independently rotatable about said longitudinal axis to rotate said means for deflecting; and
    means for feeding the cohesive material into said rotating means where a difference in rotational rate between said interior and said deflecting means at least in part determines a rate of conveyance of the cohesive material axially along said interior.

2. An apparatus comprising:
    a cylindrical pipe comprising a first open end, a second open end and an interior wall, said cylindrical pipe being configured to be operable for rotation about a longitudinal axis with a rotational rate at least sufficient for a cohesive material, feed fed into said cylindrical pipe, to remain substantially stationary in a layer on said interior wall during the rotation;

a plurality of blades being configured to be operable for deflecting the cohesive material, each of said blades comprising a blade edge having a curvature substantially corresponding to a portion of said interior wall;

a support structure for supporting said blade edges within an interior of said cylindrical pipe along a line at a fixed distance from said longitudinal axis with each of said blade edges proximate said interior wall and having an angle with respect to a plane perpendicular to said longitudinal axis, said support structure being independently rotatable about said longitudinal axis to rotate said plurality of balades; and an inlet feed apparatus for feeding the cohesive material into said first open end where a difference in rotational rate between said interior wall and said plurality of blades, and said angle at least in part determines a rate of conveyance of the cohesive material axially along said interior wall.

3. The apparatus as recited in claim 2, in which said support structure is configured to be operable to vary said angle from a first angle through a zero angle to a second angle where said rate of conveyance varies in a first direction with said angle at said first angle to said zero angle, said rate of conveyance is zero with said angle at said zero angle, and said rate of conveyance varies in a second direction with said angle from zero to said second angle.

4. The apparatus as recited in claim 2, in which said support structure is configured to be operable to vary a rotation of said plurality of blades independently from said cylindrical pipe from a first rotational rate less than said rotational rate of said cylindrical pipe through said rotational rate of said cylindrical pipe to a second rotational rate greater than said rotational rate of said cylindrical pipe where said rate of conveyance varies in a first direction with said rotation of said plurality of blades at said first rotational rate to said rotational rate of said cylindrical pipe, said rate of conveyance is zero with said rotation of said plurality of blades at said rotational rate of said cylindrical pipe, and said rate of conveyance varies in a second direction with said rotation of said plurality of blades from rotational rate of said cylindrical pipe to said second rotational rate.

5. The apparatus as recited in claim 2, in which said plurality of blades comprises a plurality of aligned separate distinct blades longitudinally spaced along said supporting structure and extending circumferentially around only a portion thereof.

6. The apparatus as recited in claim 2, in which each of said blades edges further comprises a portion having a zero angle with respect to said plane perpendicular to said longitudinal axis.

7. The apparatus as recited in claim 6, in which said blade edges are joined to form a ribbon.

8. The apparatus as recited in claim 4, in which said blade edges are joined to form a continuous ribbon.

9. The apparatus as recited in claim 2, in which said line of said blade edges is positioned where gravity lowers a normal force of the cohesive material on said interior wall and where gravity accelerates the cohesive material in a circumferential direction with the apparatus in a horizontal or inclined position.

10. The apparatus as recited in claim 2, in which each of said blade edges said angle varies along said blade edge.

11. The apparatus as recited in claim 2, in which said cylindrical pipe is further configured to be operable for feeding the cohesive material to an additional cylindrical pipe being configured to be operable substantially as said cylindrical pipe enabling a plurality of apparatuses to be daisy-chained together.

12. The apparatus as recited in claim 2, in which said inlet feed apparatus is configured to be operable for feeding the cohesive material at a rate substantially equaling said rotational rate of said cylindrical pipe.

13. A method comprising the steps of:

rotating a cylindrical pipe comprising a first open end, a second open end and an interior wall about a longitudinal axis with a rotational rate at least sufficient for a cohesive material, fed into said cylindrical pipe, to remain substantially stationary in a layer on said interior wall during the rotation;

supporting a plurality of blades within an interior of said cylindrical pipe along a line at a fixed distance from said longitudinal axis with each of said blade edges proximate said interior wall and having an angle with respect to a plane perpendicular to said longitudinal axis for deflecting the cohesive material, each of said blades comprising a blade edge having a curvature substantially corresponding to a portion of said interior wall;

independently rotating said des about said longitudinal axis; and feeding the cohesive material into said first open end where a difference in rotational rate between said interior wall and said plurality of blades, and said angle at least in part determines a rate of conveyance of the cohesive material axially along said interior wall.

14. The method as recited in claim 13, further comprising the step of varying said angle from a first angle through a zero angle to a second angle where said rate of conveyance varies in a first direction with said angle at said first angle to said zero angle, said rate of conveyance is zero with said angle at said zero angle, and said rate of conveyance varies in a second direction with said angle from zero to said second angle.

15. The method as recited in claim 13, further comprising the step of varying a rotation of said plurality of blades independently from said cylindrical pipe from a first rotational rate less than said rotational rate of said cylindrical pipe through said rotational rate of said cylindrical pipe to a second rotational rate greater than said rotational rate of said cylindrical pipe where said rate of conveyance varies in a first direction with said rotation of said plurality of blades at said first rotational rate to said rotational rate of said cylindrical pipe, said rate of conveyance is zero with said rotation of said plurality of blades at said rotational rate of said cylindrical pipe, and said rate of conveyance varies in a second direction with said rotation of said plurality of blades from rotational rate of said cylindrical pipe to said second rotational rate.

16. The method as recited in claim 13, further comprising the step of positioning said line of said blade edges to where gravity lowers a normal force of the cohesive material on said interior wall and where gravity accelerates the cohesive material in a circumferential direction with operation in a horizontal or inclined position.

17. The method as recited in claim 13, further comprising the step of feeding the cohesive material from said cylindrical pipe to an additional cylindrical pipe being configured to be operable substantially as said cylindrical pipe enabling a plurality of apparatuses to be daisy-chained together.

18. The method as recited in claim 13, in which the step of feeding the cohesive material further comprises feeding the cohesive material at a rate substantially equaling said rotational rate of said cylindrical pipe.

19. The apparatus as recited in claim 2 in which the feeding mechanism is comprised of a tapered conical endpiece with a plurality of exterior scoops to collect material and feed it into said cylindrical pipe with a circumferential velocity that nearly matches the pipe-wall velocity.

20. The apparatus as recited in claim 19 wherein said tapered conical endpiece further comprises a plurality of substantially axial tapered inner tilted blades.

* * * * *

UNITED STATES PATENT AND TRADEMARK OFFICE
CERTIFICATE OF CORRECTION

PATENT NO.         : 8,607,966 B2
APPLICATION NO.    : 13/044328
DATED              : December 17, 2013
INVENTOR(S)        : Otis Walton, Ali Ismail Abdel-Hadi and Christopher Brian Dreyer It is certified that error appears in the above-identified patent and that said Letters Patent is hereby corrected as shown below:

In the Specification

Column 1, Line 20 FEDERALLY SPONSORED RESEARCH OR DEVELOPMENT should be replaced with the following:

"This invention was made with Government support under contract NNX10CD26P awarded by NASA. The Government has certain rights in this invention."

Signed and Sealed this
Twenty-fifth Day of March, 2014

Michelle K. Lee
*Deputy Director of the United States Patent and Trademark Office*